United States Patent
Hitt et al.

(10) Patent No.: US 11,495,974 B2
(45) Date of Patent: Nov. 8, 2022

(54) MODULAR ULTRACAPACITOR ENERGY STORAGE/POWER DELIVERY APPARATUS AND METHODS

(71) Applicant: UCAP Power, Inc., San Diego, CA (US)

(72) Inventors: Joshua Hitt, Chula Vista, CA (US); Troy Brandon, San Diego, CA (US); Blaine Bynum, Santa Barbara, CA (US); Gordon Schenk, Rancho Santa Fe, CA (US)

(73) Assignee: UCAP Power, Inc., San Diego, CA (US)

( * ) Notice: Subject to any disclaimer, the term of this patent is extended or adjusted under 35 U.S.C. 154(b) by 252 days.

(21) Appl. No.: 16/810,741

(22) Filed: Mar. 5, 2020

(65) Prior Publication Data
US 2021/0265848 A1 Aug. 26, 2021

Related U.S. Application Data

(60) Provisional application No. 62/981,432, filed on Feb. 25, 2020.

(51) Int. Cl.
*H02J 7/00* (2006.01)
*H01G 11/00* (2013.01)

(52) U.S. Cl.
CPC .......... *H02J 7/00038* (2020.01); *H01G 11/00* (2013.01)

(58) Field of Classification Search
USPC ........................................................ 320/167
See application file for complete search history.

(56) References Cited

U.S. PATENT DOCUMENTS

| 9,461,483 B1* | 10/2016 | Hsu ................. H01G 11/04 |
| 2008/0013253 A1 | 1/2008 | Thrap et al. |
| 2010/0157532 A1 | 6/2010 | Nguyen et al. |

(Continued)

FOREIGN PATENT DOCUMENTS

CN 102355042 A 2/2012

OTHER PUBLICATIONS

Richardson Electronics, Power & Microwave Technologies, "Introducing Richardson Electronics' ULTRA3000, Energy Storage and Power Delivery for Wind Turbine Pitch System", 2020, 1 pg.

*Primary Examiner* — Samuel Berhanu
(74) *Attorney, Agent, or Firm* — Knobbe Martens Olson & Bear, LLP

(57) ABSTRACT

A modular integrated ultracapacitor-based energy storage and power delivery apparatus (UCAP module) is described. In some embodiments, the UCAP module comprises: at least one ultracapacitor cell coupled together in a series, parallel, or combination of both series and parallel configuration; an integrated charging unit; conductive hardware electrically coupling the ultracapacitors cells together; at least one UCAP terminal rod extending throughout the UCAP module and used to route power within the UCAP module and in some embodiments to other UCAP modules; and a protective casing. In some embodiments the UCAP terminal rod couples the UCAP module to at least one additional UCAP module in a series, parallel, or a combination of both series and parallel configurations. In other embodiments, the UCAP module further comprises connector rods that electrically and mechanically couple the UCAP module to at least one additional UCAP module.

20 Claims, 6 Drawing Sheets

(56) References Cited

U.S. PATENT DOCUMENTS

| | | | |
|---|---|---|---|
| 2012/0206877 A1* | 8/2012 | Park | H01G 9/26 |
| | | | 361/689 |
| 2017/0033408 A1 | 2/2017 | O'Hora | |
| 2017/0098873 A1 | 4/2017 | Tsuchiya et al. | |
| 2018/0375345 A1 | 12/2018 | Altemose | |

* cited by examiner

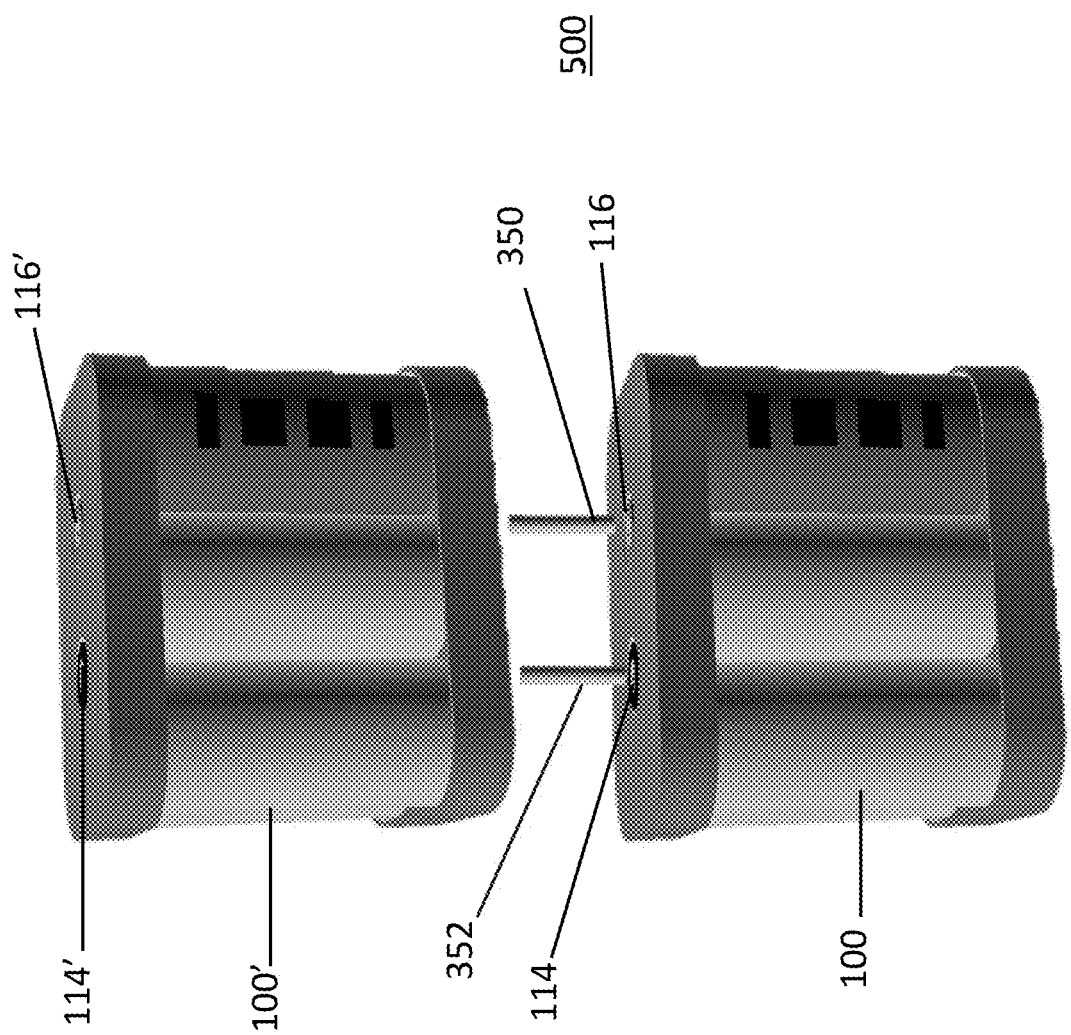

MODULAR ULTRACAPACITOR ENERGY STORAGE/POWER DELIVERY APPARATUS AND METHODS

CROSS-REFERENCE TO RELATED APPLICATIONS—CLAIM OF PRIORITY

The present application claims priority to U.S. Provisional Application No. 62/981,432, filed Feb. 25, 2020, entitled "Modular Ultracapacitor Energy Storage/Power Delivery Apparatus and Methods", which is herein incorporated by reference in its entirety.

BACKGROUND

(1) Technical Field

The disclosed apparatus and methods are related to electric energy storage and charging systems, and more specifically to modular integrated ultracapacitor-based power conversion and energy storage devices.

(2) Background

Many modern electronic systems require efficient energy storage and charging solutions. Energy storage is an essential component in creating sustainable energy systems. Electronic devices, which have become ubiquitous in modern society, are heavily reliant on energy storage technologies. The breadth of products and industries which energy storage affects demonstrates how valuable advances and breakthroughs in this field have become.

Ultracapacitors, also known as "supercapacitors" or "electric double-layer capacitors" (referred to hereafter as "UCAPs"), have emerged with potential to supplement or even replace batteries in many energy storage applications. UCAPs store energy differently than do batteries. More specifically, energy is stored electrostatically in UCAPs on the surface of the electrode and does not involve chemical reactions as occur in batteries. UCAPs are governed by the same fundamental equations as conventional capacitors, however they utilize higher surface area electrodes and thinner layer virtual dielectrics to achieve greater capacitances. This results in energy densities that are greater than those of conventional capacitors and power densities that are greater than those of available batteries. Given their fundamental mechanism, UCAPs have advantages over batteries in terms of power density, charge and discharge rates, operating life, cycle life, temperature performance, chemical stability, reliability, etc. For example, UCAPs can perform one million or more charge/discharge cycles with predictable aging characteristics. As a result, UCAPs have increasingly become an attractive power solution in many different applications that require relatively large or frequent bursts of electrical power.

UCAPs utilize high surface area electrode materials and thin layer virtual dielectrics to achieve capacitances several orders of magnitude larger than conventional capacitors. In doing so, UCAPs attain greater energy densities, while maintaining the characteristic high power density of conventional capacitors. The energy stored by a UCAP is directly proportional to its capacitance. Conventional capacitors have relatively high power densities, but relatively low energy densities as compared to electrochemical batteries and to fuel cells. In general, batteries store more total energy than do capacitors, but they do not deliver their stored energy very quickly.

The power density of batteries is low when compared with the power density of UCAPs. UCAPs have a very low equivalent series resistance (ESR). While UCAPs store relatively less energy per unit mass or volume, the energy stored by UCAPs is discharged rapidly to produce significant amounts of power. UCAPs are used to deliver power while undergoing sudden or frequent charge/discharge cycles at high current and relatively short duration. This is essential in certain energy storage and charging applications. There are some important differences in the charging methods utilized for UCAPs, which must charge from zero volts and appear as a virtual short-circuit due to their very low ESR.

Given the advantages of UCAP energy solutions over their battery counterparts set forth above, there is a need in the industry for modular integrated UCAP electric energy storage and charging solutions that can supplement and/or replace battery-based solutions. The present disclosure describes such modular integrated UCAP electric energy storage and charging apparatus and methods. Advantageously, in many applications, the disclosed modular integrated UCAP electric energy storage and charging solutions may be used to directly replace existing batteries.

SUMMARY

A modular integrated UCAP electric energy storage and charging apparatus and method is described. In some embodiments, the ultracapacitor-based energy storage and power conversion apparatus comprise: (a) a plurality of high-capacity UCAP cells electrically coupled together in a series configuration; (b) a power conversion device capable of charging the series of UCAP cells using a variety of alternating current (AC) or direct current (DC) power sources; (c) conductive hardware to physically connect the cells in series; (d) a protective enclosure for safety; and (f) at least one UCAP terminal rod used to route power within the apparatus and used in some embodiments to electrically couple the apparatus to power circuits, and to couple at least two UCAP modules together in either series or parallel configurations. In other embodiments, the plurality of UCAP cells may be electrically coupled together in a parallel configuration within the UCAP module, and/or in a combination of both a series and parallel configuration of UCAP cells.

The details of one or more embodiments of the disclosed apparatus are set forth in the accompanying drawings and the description below. Other features, objects, and advantages of the disclosed apparatus will be apparent from the description and drawings, and from the claims.

DESCRIPTION OF THE DRAWINGS

FIG. 4b shows two UCAP modules exemplifying the stacking feature provided by the design of the present UCAP module in configuring the stacked UCAP modules in a parallel arrangement.

Like reference numbers and designations in the various drawings indicate like elements.

DETAILED DESCRIPTION

Embodiments of the disclosed apparatus are useful and perform a wide range of functions in a variety of energy storage and charging systems, including (but not limited to) generator start, engine start/stop, electronic steering response, renewable grid frequency stabilization, wind turbine emergency pitch systems, autonomous guided vehicles, and crane regenerative braking. Details of some examples of embodiments are described below with reference to the accompanying figures.

Figure 1:
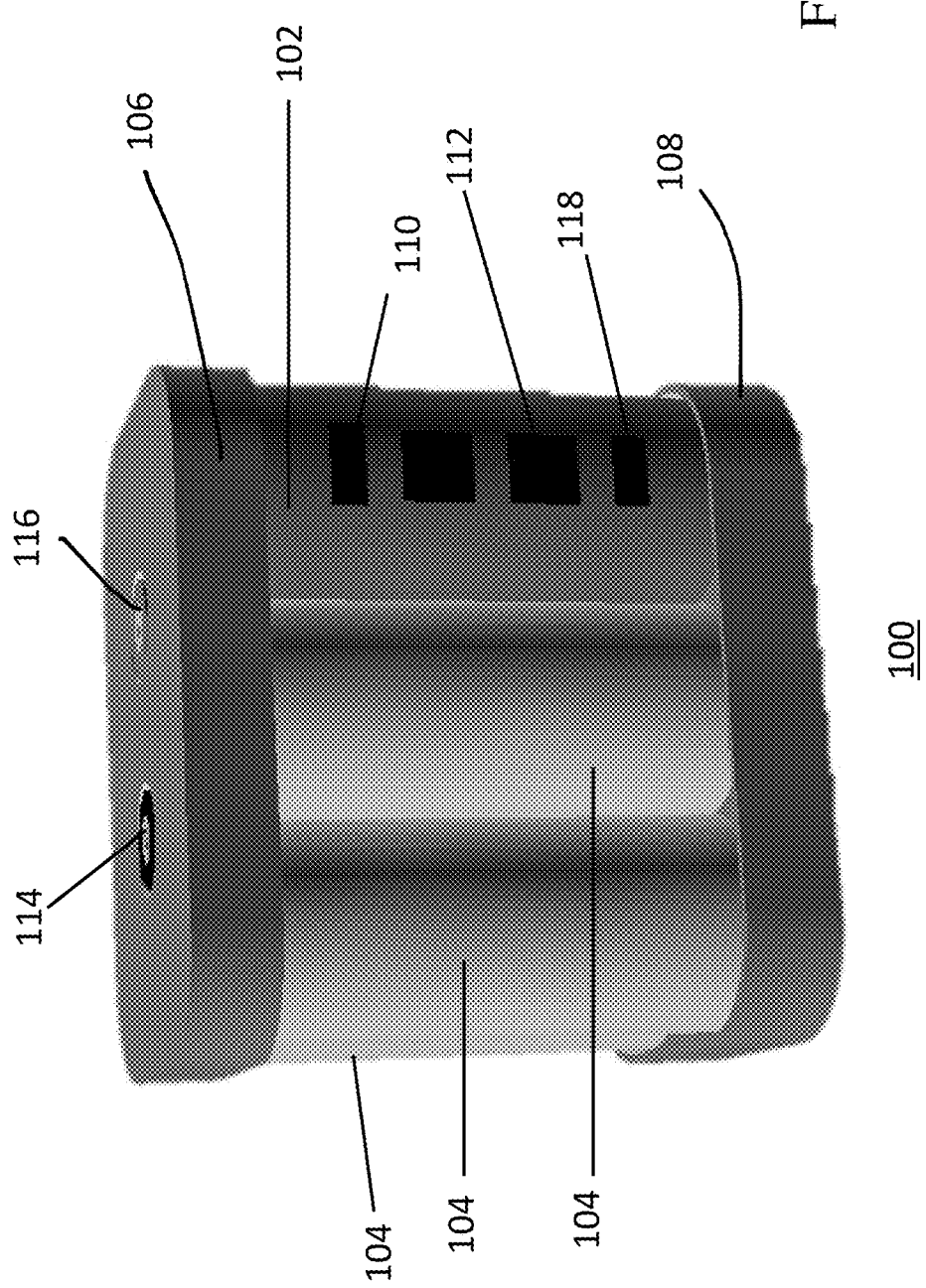
FIG. 1 shows one embodiment of a modular integrated ultracapacitor (UCAP) electric energy storage and charging apparatus (hereafter "UCAP module").

FIG. 1 shows one embodiment of a modular integrated ultracapacitor (UCAP) energy storage and charging apparatus (hereafter "UCAP module") 100. As shown in FIG. 1, in some embodiments, the UCAP module 100 includes a charging unit 102, and a plurality of UCAP cells 104 arranged in close proximity to each other and in close proximity to the charging unit 102. In some such embodiments, the charging unit 102 is similar if not identical in size to the UCAP cells 104. In some of those embodiments, the charging unit 102 is capable of accepting AC or DC input power using standard commercially available charging cables.

The charging unit 102 can use a variety of AC/DC input power charging sources to charge the UCAP cells, with the charging unit 102 electrically isolating the UCAP cells from the charging source. This allows multiple UCAP modules to charge from the same source when they are connected together in series. The resulting circuit generates a new, frequency stabilized DC voltage output without the need for any additional power conversion equipment. Users can easily adjust the output voltage level to nearly any value by adding or removing UCAP modules.

The charging unit 102 and the plurality of UCAP cells 104 are kept firmly in place and held together within a casing comprising a top casing cover 106 and a bottom casing cover 108. As described in more detail below, in some embodiments, the top and bottom casing covers 106, 108 are held in place using bolts that mechanically secure the covers to mounting plates positioned beneath the top casing cover 106 and above the bottom casing cover 108. The material used to make the bolts may be plastic or metal, depending on application requirements. The charging unit 102 is compatible with a wide range of readily-available power sources using standard cables and connectors. The charging unit 102 can be factory-configured to accommodate and accept a variety of charging voltages. In some embodiments of the present UCAP module 100, the charging unit 102 may be field adjustable to accommodate desired charging voltages. Additionally, the charging unit 102 may be mounted to face either the long or short face of the UCAP module 100, depending on application needs. This can be implemented during assembly of the UCAP module 100 by loosening the UCAP module end covers and re-orienting and repositioning the charging unit 102 within the UCAP module 100. In some embodiments, the charging unit 102 is removable and replaceable for ease-of-use and serviceability. Alternatively, during factory assembly, the charging unit 102 may be replaced by an additional UCAP cell 104. This allows for higher voltage performance or increased service life when integrated charging is not required by certain applications.

As shown in FIG. 1, in some embodiments the charger unit 102 comprises a dual use DC unit including a DC input/output port 110. The charger unit 102 may be connected to DC power sources within a specified voltage range, including, for example, solar panels or other renewable power sources. The charging unit 102 also includes an AC input port 112 in some embodiments. When connected to AC power through the AC input port 112, the UCAP module 100 also has the capability to output DC power for use by accessory devices connected thereto. In other embodiments, the UCAP module 100 includes a universal serial bus (USB) port 118 that provides standard USB (e.g., 5V/2.1A) output power to devices requiring such power requirements. In some embodiments, the USB port 118 may also be used to support monitoring or control software.

As shown in FIG. 1, in some embodiments, the UCAP module 100 includes two UCAP terminal rods 114, 116 that extend from the bottom casing cover 108 to the top casing cover 106. As described in more detail below with reference to FIGS. 2 and 3, in some embodiments, the UCAP terminal rods 114, 116 comprise positive and negative UCAP terminal rods, respectively, that may be electrically coupled to other UCAP modules 100 in either a parallel or serial configuration. This aspect of the present UCAP module 100 is described in more detail below with reference to FIGS. 2-4b, inclusive.

Figure 2:
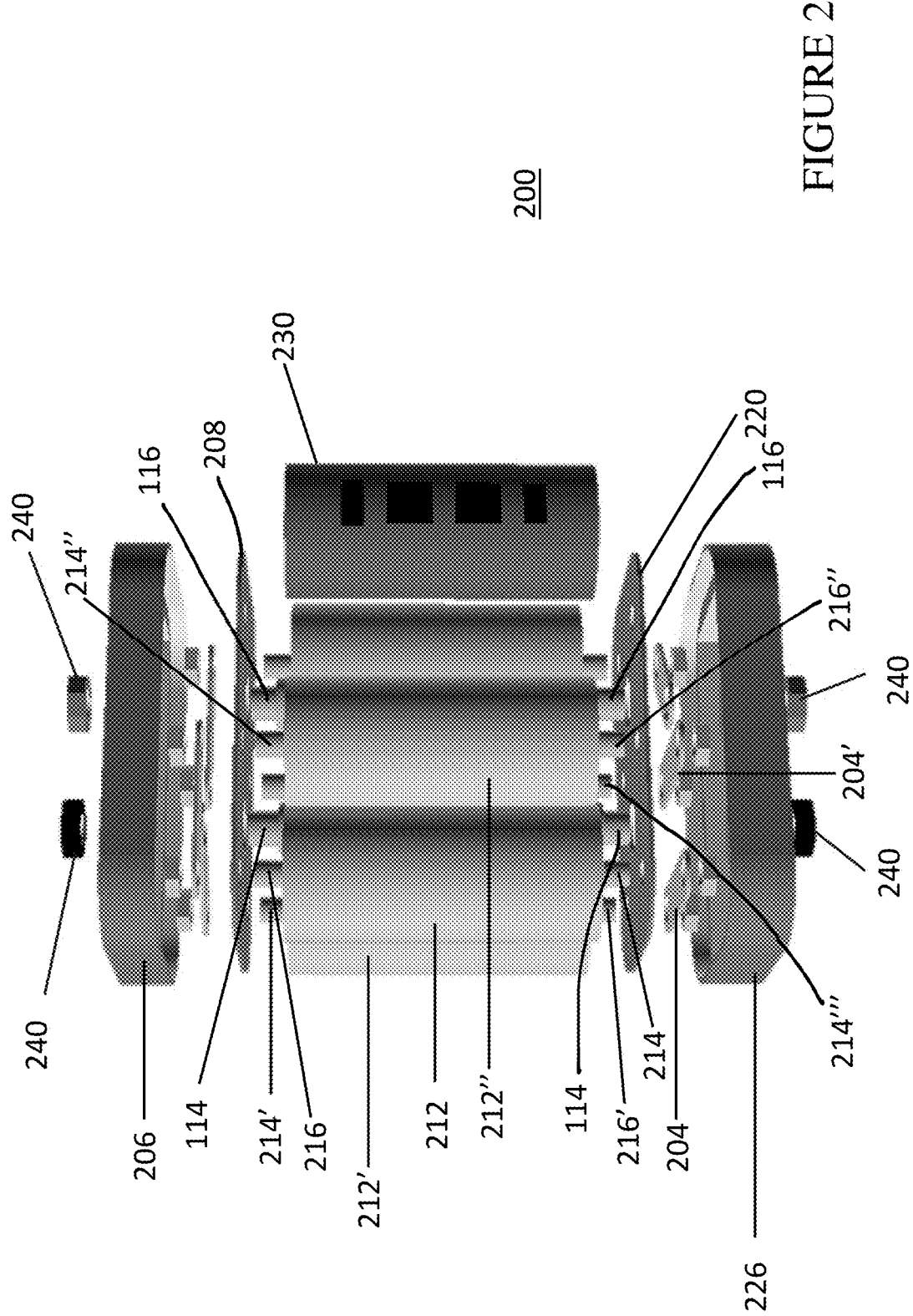
FIG. 2 shows an exploded view of the unassembled UCAP module of FIG. 1.

FIG. 2 shows an exploded view of an unassembled UCAP module 200 described above with reference to FIG. 1. FIG. 2 shows more details of the assembled UCAP module 100 of FIG. 1. As shown in FIG. 2, and similar to the UCAP module 100 of FIG. 1, some embodiments of the UCAP module 200 include at least one UCAP cell 212 (for example, and as shown in FIG. 2, the UCAP cells 212, 212', 212", etc.). The UCAP cells 212 are arranged in close proximity to each other so as to reduce the overall footprint of the UCAP module 200. In some embodiments, the UCAP cells 212 are of similar or identical size and volume.

In some embodiments, each UCAP cell (for example, the UCAP cell 212) has a positive terminal (such as, for example, a positive terminal 216 of FIG. 2) at a first distal end and a negative terminal (such as, for example, a negative terminal 214) at an opposite second distal end of the UCAP cell 212. In some embodiments, the UCAP cells 212 are arranged within the UCAP module 200 so that the positive and negative terminals of adjacent UCAP cells are flipped horizontally when compared with the terminal polarities of previous adjacent UCAP cells. For example, as shown in FIG. 2, in some embodiments the UCAP cell 212 has a positive cell terminal 216 facing the topside (i.e., facing a top casing cover 206) of UCAP module 200. The UCAP cell 212 also has an associated and corresponding negative cell terminal 214 facing toward the bottom side of the UCAP module 200 (i.e., facing the bottom casing cover 226). The terminals of adjacent UCAP cells 212' and 212" are positioned such that their associated and respective UCAP cell terminals are opposite in polarity in comparison to the adjacently positioned UCAP cell terminals 214, 216 of the UCAP cell 212. More specifically, the adjacent UCAP cells 212' and 212" (positioned adjacent to the UCAP cell 212) are arranged such that their associated positive UCAP cell terminals 216' and 216", respectively, face the bottom side of the UCAP module 200, and are adjacent to the negative cell terminal 214 of the UCAP cell 212. Similarly, the negative UCAP cell terminals 214' and 214" of the UCAPs 212', 212", respectively, face the topside of the UCAP module 200, and are positioned adjacent to the positive UCAP cell terminal 216 of the UCAP cell 212. This arrangement facilitates electrically coupling of the UCAP cells 212 together in a series configuration.

In some embodiments, some or all of the UCAP cells are positioned such that all of their associated positive cell terminals face the top casing cover 206 (or they all face the bottom casing cover 226 in yet another embodiment) thereby positioning all of the positive cell terminals adjacent to each other. This allows for a simple electrical coupling of the positive cell terminals (using the bus bars such as bus bar 204) to one another. Similarly, all of the negative cell terminals may be positioned adjacent to one another and all facing either the top casing cover 206 (when the positive cell terminals all face the bottom casing cover 226) or all facing the bottom casing cover 226 (when the positive cell terminals all face the top casing cover 206). This embodiment facilitates coupling all of the UCAP cells in a parallel configuration by coupling all of the positive cell terminals together and coupling all of the negative cell terminals together. Also, in yet another embodiment, the UCAP cells can be arranged to be configured in both a series configuration (for example, two UCAP cells can be coupled together to form a series circuit) in combination with a parallel configuration (by coupling the remaining UCAP cells in a parallel configuration).

In some embodiments, such a series UCAP cell configuration is implemented by electrically coupling a positive cell terminal of a first UCAP cell to a negative cell terminal of an adjacent second UCAP cell, and so on, using electrical bus plates or busbars (e.g., using the bus plates 204, 204', etc., shown in FIG. 2) and described below in more detail.

As shown in FIG. 2, in some embodiments the UCAP module 200 includes a charging unit 230 capable of charging the at least one UCAP cells 212. The charging unit 230 is designed in some embodiments to be approximately the same size and volume as the UCAP cells 212. The charging unit 230 has the same characteristics as the charging unit 102 described above with reference to FIG. 1. In addition, the charging unit 230 is arranged in close proximity to the plurality UCAP cells 212. The embodiments shown in FIGS. 1 and 2 utilize five (5) UCAP cells (104 and 212, respectively) and one (1) charging unit (102 and 230) in a single UCAP module (100, 200) implementation. Those skilled in the electric energy storage and charging arts shall recognize that many other UCAP/charging unit configurations may be designed to accommodate specific power needs and applications. For example, the present UCAP module 100, 200 may be adapted to use many more UCAP cells and additional charging units if required by energy storage and charging applications. The embodiments 100 (of FIG. 1) and 200 (of FIG. 2) are illustrative of some embodiments of the present UCAP module, however several variations on these implementations may be made without departing from the scope of the disclosed method and apparatus.

Referring again to FIG. 2, some embodiments of the UCAP module 200 include a top casing cover 206 and a bottom casing cover 226. The top casing cover 206 is similar if not identical to the top casing cover 106 described above with reference to FIG. 1. The bottom casing cover 226 is similar if not identical to the bottom casing cover 108 described above with reference to FIG. 1. The UCAP module 200 also includes a top mounting plate 208 that is used to mount the top casing cover 206 to the UCAP module 200. The top mounting plate 208 is also used to firmly hold the UCAP cells 212 and the charging unit 230 within the UCAP module 200. As shown in FIG. 2, the assembly also includes a bottom mounting plate 220 that is used to mount the bottom casing cover 226 to the UCAP module 200. The bottom mounting plate 220 is also used to firmly hold the UCAP cells 212 and the charging unit 230 within the UCAP module 200. As shown in FIG. 2, a plurality of bolts 240 may be used to screw down on the UCAP terminal rods 114, 116 at both the top side of the top casing cover 206 and at the bottom side of the bottom casing cover, 226, thereby mechanically securing UCAP module 200 together. The plurality of bolts 240 hold the UCAP module 200 firmly together and keep the UCAP cells 212 and charging unit 230 held in close proximity to one another.

In some embodiments, the integrated charging unit 230 is factory-configured to provide various charging voltages. In some embodiments, the charging unit 230 is field-adjustable to provide a desired charging voltage.

As noted briefly above, the UCAP modules 100, 200 also include at least one bus plate or bus bar (for example, the bus plates 204, 204' shown in FIG. 2). In the embodiment shown in FIG. 2, the bus plates (e.g., the bus plates 204, 204') are used to electrically couple UCAP cell terminals of different UCAP cells together to form an electrical circuit from the UCAP cells. For example, as shown in FIG. 2, the bus plate 204 electrically couples the positive cell terminal 216' of the UCAP cell 212' to the negative cell terminal 214 of the UCAP cell 212. Similarly, the bus plate 204' electrically couples the positive cell terminal 216" of the UCAP cell 212" to a negative cell terminal 214''' of a UCAP cell 212''' (the UCAP cell 212''' is not clearly shown in the FIGURES). By electrically coupling a positive terminal of a first UCAP cell to a negative terminal of an adjacent UCAP cell together, and so on, a series electric circuit configuration is implemented between the UCAP cells 212. Assuming that each UCAP cell stores approximately 3.0 Volts, for example, a 15 Volt energy storage solution is easily implemented by arranging and coupling five (5) UCAP cells 212 together to form a series configuration of the UCAP cells. As described in more detail below with reference to FIG. 3, the UCAP module 200 includes UCAP terminal rods 114, 116 (shown in FIG. 3) that extend throughout the height of the UCAP module, and more particularly, the interior of the UCAP module, extending from the bottom to the topside of the UCAP module 200. The positive terminal of the last UCAP cell of the series configuration is electrically coupled to one of the UCAP terminal rods making it an electrically "positive" UCAP terminal rod (for example, the UCAP terminal rod 114 of FIGS. 1 and 2 may be made into an electrically a positive terminal rod in this manner). Similarly, the negative terminal of the first UCAP cell of the series configuration is electrically coupled to the other UCAP terminal rod 116, thereby making it an electrically "negative" terminal rod. As noted above, the UCAP module may be quickly adapted from a series configuration to a parallel configuration, or even to a combinational circuit using both UCAP cells connected in series and some UCAP cells connected in parallel. This aspect makes the UCAP module very flexible to meet a number of different energy storage applications.

Figure 3:
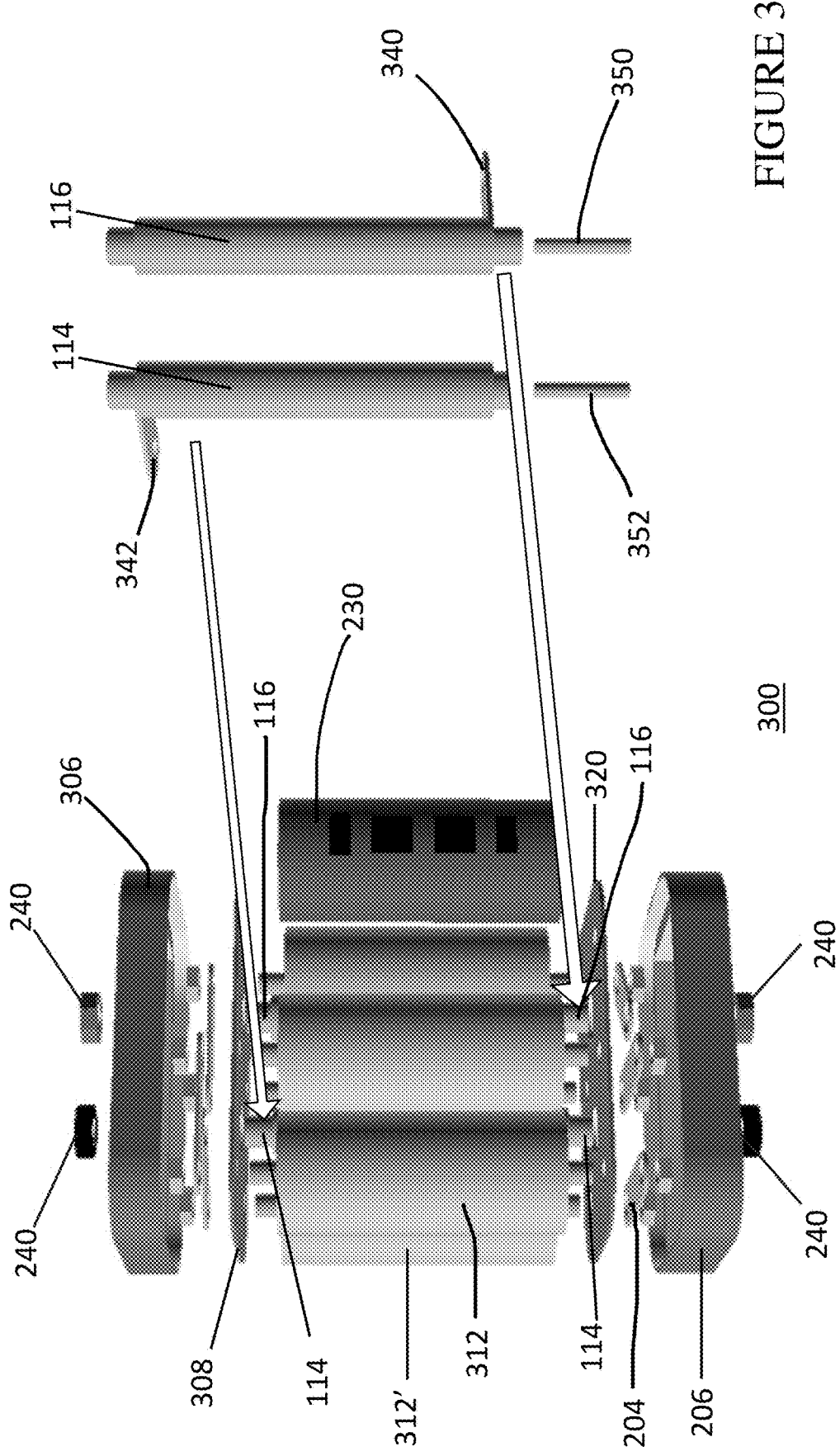
FIG. 3 shows the exploded view of the unassembled UCAP module of FIG. 2, including UCAP terminal rods and connector rods used in some embodiments to couple the UCAP module to other UCAP modules.

Referring now simultaneously to both FIGS. 2 and 3, the UCAP modules 200, 300 include two UCAP terminal rods 114, 116 (partially shown in FIG. 2 and more fully shown in FIG. 3). The UCAP terminal rods 114, 116 extend throughout the height of the interior of the UCAP module 300 from the bottom mounting plate 320 up to and through the top mounting plate 308. In some embodiments, each UCAP terminal rod 114 and 116 includes electrical connectors 340

(for the UCAP terminal rod 116) and 342 (for the UCAP terminal rod 114) positioned and connected to the UCAP terminal rods 116, 114 at their distal ends. In some embodiments, the UCAP terminal rods 114, 116 are internally threaded at the top and bottom, with an inset screw (not shown in the figures) inserted at each distal end of each UCAP terminal rod 114, 116. In some embodiments, the inset screw is accessible through an opposite end of the UCAP terminal rod using a long hand tool. In some embodiments, as described in more detail below with reference to FIGS. 4a and 4b, the UCAP module may be coupled to a second UCAP module in either a series or parallel configuration, or in a combination of both series and parallel configurations. For example, the UCAP module 100 of FIGS. 4a and 4b can be coupled to a second UCAP module 100' in any desired configuration by aligning the UCAP terminal rods of the two UCAP modules 100 and 100' and coupling them together both electrically and mechanically using the inset screw(s). As described in more detail below, when the UCAP module is coupled together with one or more other UCAP modules, the coupled modules comprise a UCAP modular system. A bushing, split washer, or other common piece of hardware may be compressed between the UCAP terminal rods as needed to ensure sufficient electrical and mechanical conductivity.

As described above, in some embodiments a first UCAP terminal rod (such as, for example, the UCAP terminal rod 114) comprises a "positive" terminal rod by electrically coupling the UCAP terminal rod 114 (using the electrical connector 342) to the positive UCAP cell terminal of the last UCAP cell of a series configuration of UCAP cells. Similarly, a negative UCAP cell terminal of the first UCAP cell of the series configuration of UCAP cells is electrically coupled to the UCAP terminal rod 116 (using the electrical connector 340), thereby making it a "negative" terminal rod 116. As shown in FIG. 3, the UCAP terminal rods 114, 116 have associated and corresponding electrical couplers (342, 340, respectively) at their distal ends. The electrical couplers 340, 342 are used in some embodiments to electrically couple the UCAP terminal rods to their corresponding and respective positive (in the case of the UCAP terminal rod 114) and negative (in the case of the UCAP terminal rod 116) UCAP cell terminals. The positive and negative UCAP terminal rods (e.g., the positive UCAP terminal rod 114 and the negative UCAP terminal rod 116) extend through the height (i.e., from the bottom of the UCAP module 300 to the top of the UCAP module 300) of the UCAP module 300 and are accessible at both the top and bottom of the UCAP module 300.

In some embodiments, the UCAP terminal rods 114, 116 are hollow. The hollow UCAP terminal rods 114, 116 may be internally threaded at their distal ends so that they can be electrically and mechanically coupled to other UCAP modules 300 forming a UCAP modular system which provides a larger UCAP energy storage/power delivery circuit than does a single UCAP module. This aspect of the present UCAP module and UCAP modular systems are described in more detail below with reference to FIGS. 4a and 4b. Terminal screws may be used to couple the UCAP terminal rods to terminal rods of other UCAP modules.

Multiple UCAP Module Stacking—UCAP Modular Systems

Some applications require more energy storage/charging capability than is provided by a single UCAP module. Advantageously, the UCAP module allows for "stacking" of UCAP modules together in a series, parallel, or in a combination of both series and parallel configurations. Multiple UCAP modules may be electrically and mechanically coupled together using the UCAP terminal rods either directly or in combination with connector rods such as those shown in FIG. 3 (i.e., the UCAP terminal rods 114, 116 and the connector rods 352, 350). Multiple UCAP modules are referred to herein as a UCAP modular system.

The fact that the UCAP terminal rods 114, 116 are accessible at both the top and bottom of the UCAP module 300 facilitates a unique stacking feature of the present UCAP module energy storage and charging solution. In electrical storage practice, it is common to connect several UCAP modules or batteries together using electrical cables, to increase either the system voltage or the available energy (or both). Connecting energy storage devices in series (i.e., connecting the positive terminal of one energy storage device to the negative terminal of another (e.g., the next) energy storage device) results in an increased system voltage equivalent to the sum of the voltages of each individual device. Connecting energy storage devices in parallel (i.e., connecting positive-to-positive terminals and negative-to-negative terminals) results in an increased available energy equivalent to the sum of the energy provided by each individual energy storage device.

The UCAP terminal rods 114, 116, in combination with the overall design of the UCAP module 300, allow several different UCAP modules to be stacked on top of each other and directly coupled together, both electrically and structurally, without the use of cables. This provides a uniquely compact method for building overall very high power energy storage systems.

Figure 4A:
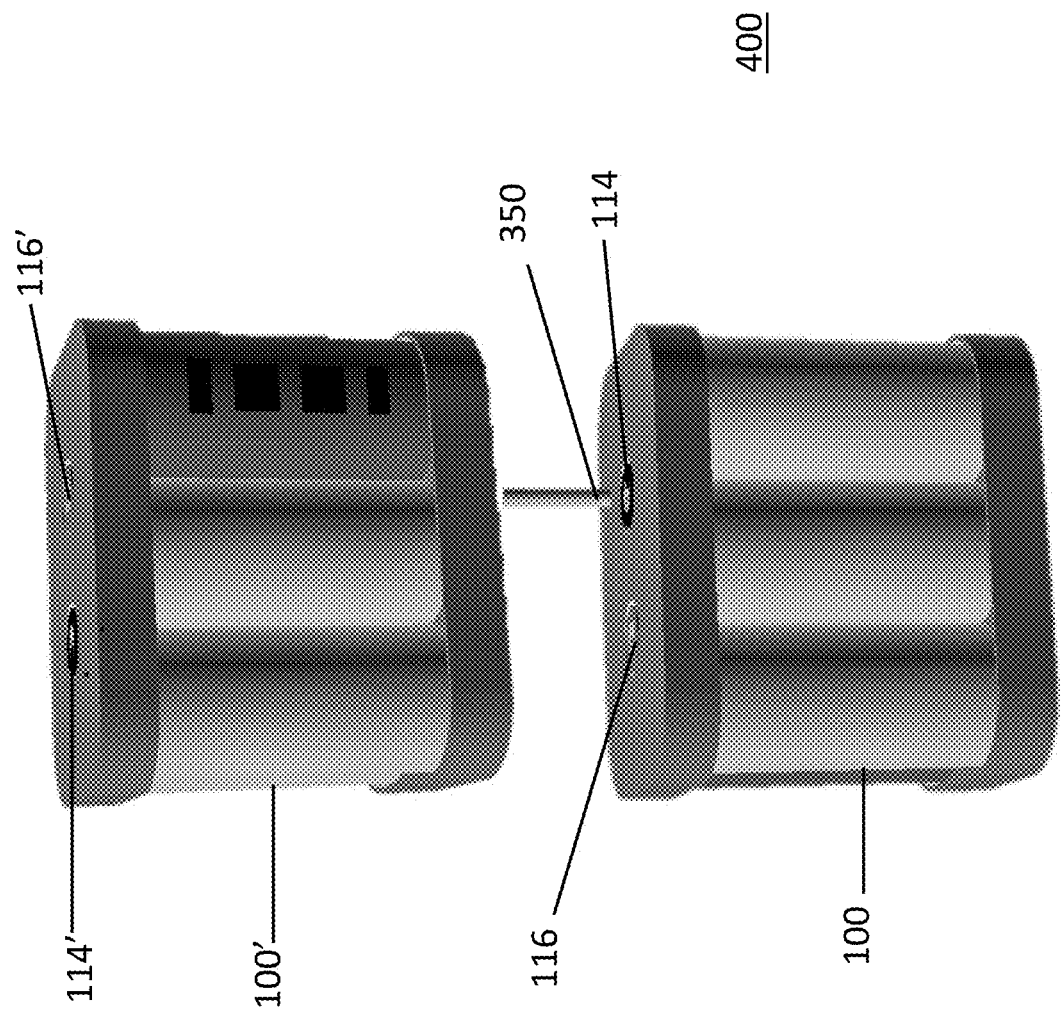
FIG. 4a shows two UCAP modules exemplifying the stacking feature provided by the design of the present UCAP module in configuring the stacked UCAP modules in a series arrangement.

FIG. 4a shows two UCAP modules 100 and 100' exemplifying the stacking feature provided by the design of the present UCAP module in configuring the UCAP modules in a series arrangement. As shown in FIG. 4a, a first UCAP module 100 and a second UCAP module 100' are electrically and mechanically coupled together using a single connector rod 350 described above with reference to FIG. 3. Using the connector rod 350, a UCAP positive terminal rod 114 of the first UCAP module 100 is both electrically and mechanically coupled to a negative UCAP terminal rod 116' of the second UCAP module 100'. As described below in more detail, the means for coupling the connector rod 350 to the UCAP terminal rod 114 and the UCAP terminal rod 116' can vary. There are several different methods for coupling the UCAP terminal rods of at least two UCAP modules together. Using the connector rod 350 as shown in FIG. 4a is only one example of how UCAP terminal rods of at least two UCAP modules can be coupled together. Assuming that a UCAP terminal rod 116 of the first UCAP module 100 is negative, the UCAP terminal rod 114 of the first UCAP module 100 is positive, the UCAP terminal rod 116' of the second UCAP module 100' is negative, and that a UCAP terminal rod 114' of the second UCAP module 100' is positive, the two UCAP modules 100, 100' shown in FIG. 4a are coupled together in a series configuration (that is, the first UCAP module 100 and the second UCAP module 100' are coupled together in a series configuration as shown in FIG. 4a).

When arranged in a series configuration as shown in FIG. 4a, only a single connector rod 350 need be used to couple the two UCAP modules 100, 100' together. A single electrical path is thereby created starting from the negative UCAP terminal rod 116 of the first UCAP module 100, through the first five UCAP cells contained within the first UCAP module 100, out of the positive UCAP terminal rod 114 of the first UCAP module 100, into the negative UCAP terminal rod 116' of the second UCAP module 100', through the second 5 UCAP cells contained within the second UCAP module 100', and out of the positive UCAP terminal rod 114' of the second UCAP module 100'. Thus, the series configuration of the two UCAP modules 100, 100' shown in FIG. 4*a* is equivalent to creating a single string of 10 UCAP cells arranged in a series configuration. Those skilled in the energy storage and delivery arts shall appreciate that the polarities of the terminal rods described as being coupled together in a series configuration (and shown in FIG. 4*a*) can be reversed without departing from the scope of the disclosed method and apparatus. For example, the two UCAP modules 100, 100' may, in some embodiments, be coupled together in a series configuration by coupling the negative UCAP terminal rod 116 of the first UCAP module 100 to the positive UCAP terminal rod 114' of the second UCAP module 100' (and leaving the other two UCAP terminal rods, 114, 116' uncoupled). Such a series configuration of the two UCAP modules 100, 100' falls within the scope of the disclosed method and apparatus. As noted above, when two or more UCAP modules are coupled together in either a series or parallel configuration, or a combination of both series and parallel arrangements, they comprise a UCAP modular system.

As noted above, connecting UCAP modules in series (i.e., connecting the positive terminal rod of a first UCAP module to the negative terminal rod of a second UCAP module) results in a higher system voltage equivalent to the sum of the voltages of each individual UCAP module.

FIG. 4*b* shows two UCAP modules 100 and 100' exemplifying the stacking feature provided by the design of the present UCAP module in configuring the UCAP modules in a parallel arrangement. As shown in FIG. 4*b*, the UCAP modules are electrically and mechanically coupled using two connector rods 350, 352, described above with reference to FIG. 3. Using the connector rod 350, the UCAP terminal rod 116 of the UCAP module 100 is both electrically and mechanically coupled to the UCAP terminal rod 116' of the UCAP module 100'. Similarly, using the connector rod 352, the UCAP terminal rod 114 of the UCAP module 100 is both electrically and mechanically coupled to the UCAP terminal rod 114' of the UCAP module 100'. As noted above, the means for coupling the connector rods to their respective UCAP terminal rods can vary, and the means of coupling the UCAP terminal rods of the two UCAP modules can vary as well. For example, it is not always necessary to use the connector rods to couple the UCAP terminal rods of the two UCAP modules together. These various means for coupling the UCAP terminal rods of two UCAP modules both electrically and mechanically fall within the scope of the disclosed method and apparatus. If the UCAP terminal rod 116 is negative and the UCAP terminal rod 116' is also negative, and the UCAP terminal rod 114 is positive and the UCAP terminal rod 114' is also positive, then the two UCAP modules shown in FIG. 4*b* are arranged in a parallel configuration (that is, the UCAP modules 100 and 100' are coupled together in parallel). As noted above, connecting devices in parallel (i.e., positive UCAP terminal rod-to-positive UCAP terminal rod and negative UCAP terminal rod-to-negative UCAP terminal rod) results in a higher available energy equivalent to the sum of each individual UCAP module. As described above, a UCAP modular system comprises two or more UCAP modules coupled together in a parallel, series, or a combination of both parallel and series configurations.

As noted above, the methods of attachment or coupling of multiple UCAP modules can vary from one implementation to another. In some embodiments, as shown in FIG. 3, threaded connector rods 350, 352, may be used. In order to couple a first UCAP module 300 to another UCAP module, the connector rods 350, 352 are screwed into (or via some other convenient attachment means, mechanically connected to) associated and corresponding UCAP terminal rods 116, 114. To connect two UCAP modules together, a first UCAP module is stacked directly onto a second UCAP module in the appropriate series or parallel orientation. In some embodiments, using a long screwdriver, the threaded connector rods are screwed down through the center of the associated and corresponding UCAP terminal rods connecting a UCAP terminal rod of a first UCAP module to a UCAP terminal rod of a second UCAP module. A compressed split lock washer or similar hardware may also be placed between the terminals prior to screwing in the connector rods to prevent loosening.

The UCAP modules 200 and 300 described above with reference to FIGS. 2-4*b* are designed as "drop-in" replacements of many typical battery applications having high power surge or cycle requirements. As described above, batteries have numerous disadvantages when compared with UCAP-based energy storage and charging solutions. One significant disadvantage is that batteries have higher life-cycle costs when compared with the life-cycle costs of UCAPs. Although UCAPs are not as widely implemented as are batteries in energy storage systems, this is mainly due to the fact that UCAP designs and the advantages provided by UCAPs are not widely known. The present UCAP module advantageously easily replaces batteries.

The present UCAP module can easily replace battery implementations across many applications, often without the need for costly design integration. Due to its modular design, the time and cost associated with integrating UCAP energy storage and power delivery in existing equipment is decreased, allowing users to benefit from the lower life-cycle costs provided by UCAP implementations.

The UCAP module apparatus provides a UCAP-based energy storage and charging system that scales in voltage or capacitance. As described in detail above, the UCAP module includes an integrated charging unit. The integrated charging unit, in cooperation with a plurality of UCAP modules, is capable of creating 24V, 48V, etc., —based systems while maintaining a low 12V charge input. Other embodiments of the plurality of UCAP modules (or "UCAP modular systems") are capable of creating any desired continuum of voltages. In this regard, the plurality of UCAP modules (or "UCAP modular system") effectively function as a DC-DC or AC-DC converter, depending on whether the input power charging source that is input to the integrated charging unit is a DC power source or an AC power source. In either case, the plurality of UCAP modules effectively perform the function of a DC-DC converter (when the input power charging source is a DC power source) and perform the function of an AC-DC converter (when the input power charging source is an AC power source).

The plurality of UCAP modules can quickly be connected in series or parallel, or a combination of both, using readably available hardware. The present UCAP module addresses a very large available market currently served by other solutions. However, the new features provide competitive differentiation over other products available in the marketplace.

Figure 5:
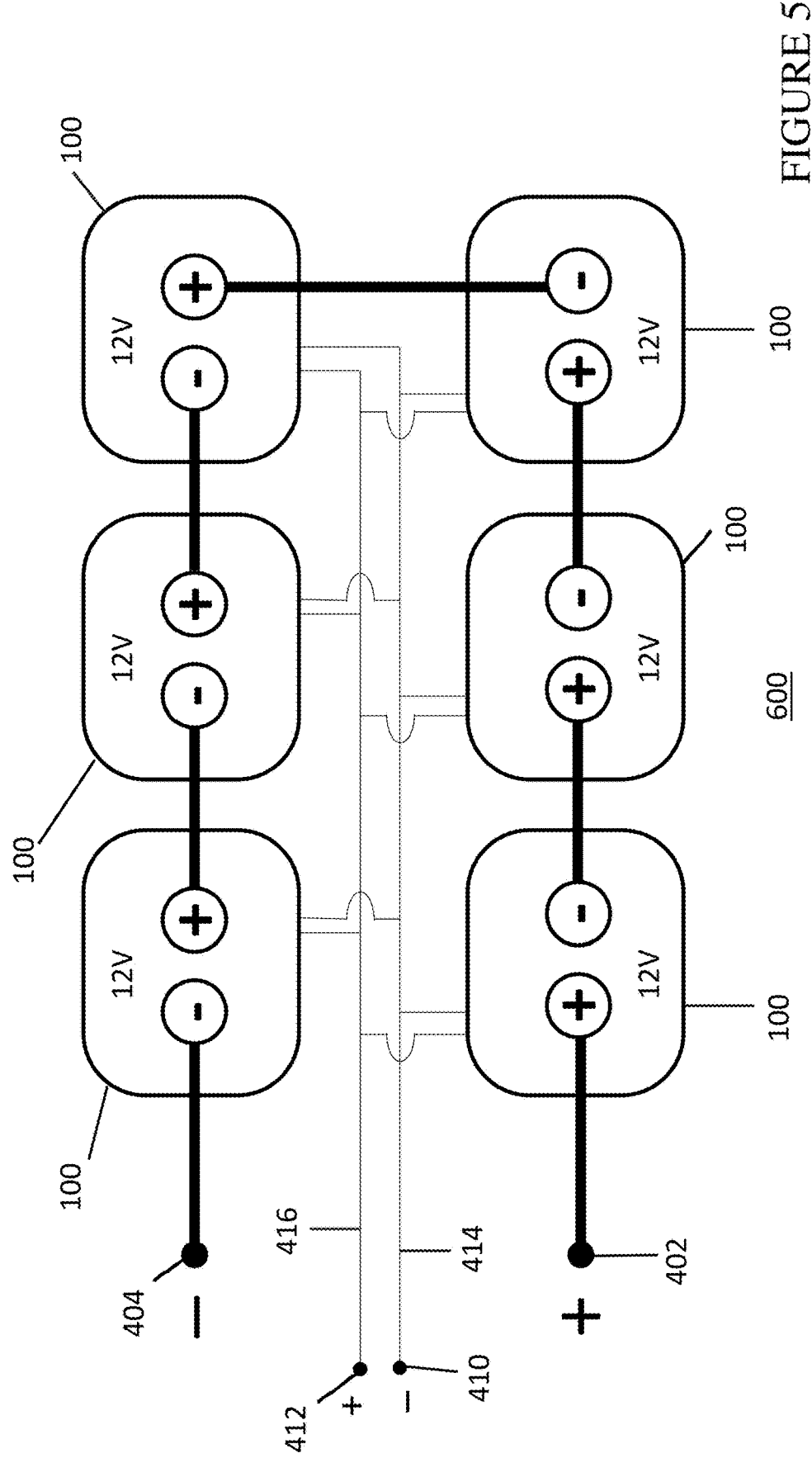
FIG. 5 is a schematic diagram showing an electrical circuit equivalent of 6 (six) UCAP modules coupled together in series to form a series arrangement.

FIG. 5 is a schematic diagram showing an electrical circuit equivalent 600 of 6 (six) UCAP modules coupled together in series to form a series arrangement. The circuit shown in FIG. 5 is just one example of a UCAP modular system. The six UCAP modules would physically be stacked one atop another as shown in FIG. 4*a*. A first of six UCAP modules 100 has its positive UCAP terminal rod coupled to a positive terminal 402 of an output bus of the circuit 600. The first UCAP module 100 has its negative UCAP terminal rod coupled to the positive UCAP terminal rod of a second UCAP module 100. Each successive UCAP module is coupled in this serial manner until a sixth UCAP module 100 has its negative UCAP terminal rod coupled to a negative terminal 404 of the output bus of the circuit 600. In the example of the multiple UCAP modules and electrical circuit equivalent 600 shown in FIG. 5, each UCAP module can store (or be charged to store) up to 12 V. Given that there are 6 UCAP modules 100 in the circuit 600 of FIG. 5, the circuit 600 is capable of storing 72 V DC and outputting this voltage onto the output bus of the circuit 600 (that is, to the positive 402 and negative 404 terminals of the DC output bus). In some embodiments this 72 V DC output is rated at greater than 1,000 A peak. In other embodiments where 3V UCAP cells are used, each UCAP module can store (or be charged to store) up to 15 V (assuming that each UCAP module contains 5 (five) 3V UCAP cells). In general, each UCAP module 100 can store (or be charged to store) a voltage that comprises an integer multiple of the number of UCAP cells in each UCAP module multiplied by the voltage storage capability of each UCAP cell. The input power charging source is input to the circuit 600 via the positive terminal 412 and the negative terminal 410. The input power charging source may either be DC or AC, as the charging unit (s) of the UCAP modules 100 may accept either type of input power charging source. As shown in FIG. 5, power is input to the charging units of each UCAP module 100 via the input power bus 414 and 416 (414 being the negative input bus line and 416 being the positive input bus line). Although 6 (six) UCAP modules are shown in the circuit of FIG. 5, those of ordinary skill in the energy storage and power delivery system design arts shall recognize that any number of UCAP modules 100 can be used to implement either a serial, parallel, or combination of serial and parallel circuit arrangements. Specifically, in one exemplary embodiment, any number of UCAP modules 100 can be placed in series in order to achieve various desired DC output voltages.

CONCLUSION

A number of advantages are offered by the present modular integrated ultracapacitor-based power conversion and energy storage apparatus. For example, the UCAP module reduces up-front integration costs due to the drop-in integrated design & modularity provided thereby. The UCAP module also reduces equipment costs as compared to alternative energy storage and charging solutions due to integrated charging and inter-connectivity with existing systems and with multiple UCAP modules. The UCAP module solution also provides reduced life-cycle costs as compared to battery alternatives due to prolonged usage life and low maintenance requirements. The described UCAP modules also have small footprints (in terms of both mass and volume) and high power density as compared to alternative solutions. The UCAP modules also are safer and are more environmentally friendly as compared to batteries. They are also easily stored, handled, have higher reliability, no risk of thermal runaway and do not use controlled hazardous materials (such as lead, lithium, cobalt, cadmium, etc.).

The power conversion system provided by the UCAP module apparatus provides a uniquely scalable combination of features. It converts, stores, and discharges electrical energy across a wide range of input and output voltages. It can efficiently convert and store energy from variable or intermittent power sources such as renewable energy or unreliable or unstable DC power systems. The UCAP cells can also support peak power loads far exceeding the capabilities of charging sources.

A number of embodiments of the disclosed UCAP module apparatus have been described. It is to be understood that various modifications may be made without departing from the spirit and scope of the claimed invention. For example, some of the steps described above may be order independent, and thus can be performed in an order different from that described. Further, some of the steps described above may be optional. Various activities described with respect to the methods identified above can be executed in repetitive, serial, or parallel fashion.

It is to be understood that the foregoing description is intended to illustrate and not to limit the scope of the claimed invention, which is defined by the scope of the following claims, and that other embodiments are within the scope of the claims. In particular, the scope of the claimed invention includes any and all feasible combinations of at least one of the processes, machines, manufactures, or compositions of matter set forth in the claims below. (Note that the parenthetical labels for claim elements are for ease of referring to such elements, and do not in themselves indicate a particular required ordering or enumeration of elements; further, such labels may be reused in dependent claims as references to additional elements without being regarded as starting a conflicting labeling sequence).

What is claimed is:

1. A modular integrated ultracapacitor (UCAP) apparatus ("UCAP module"), comprising:
    (a) at least two ultracapacitor cells configured to be coupled in a parallel, series and in a combination of both parallel and series configurations;
    (b) a charging unit accepting an input power source and electrically coupled to the ultracapacitors; wherein the charging unit charges the ultracapacitor cells from a discharged state to a fully charged state;
    (c) a casing mechanically holding the ultracapacitor cells and the charging unit in place within the UCAP module, the ultracapacitor cells and the charging unit disposed within the casing, wherein the UCAP module has a height and a length and wherein the UCAP module has a top side and a bottom side; and
    (d) at least one UCAP terminal rod extending throughout the height of the UCAP module such that the at least one UCAP terminal rod is externally accessible from the top side and from the bottom side of the UCAP module, wherein the at least one UCAP terminal rod comprises an electrically positive UCAP terminal rod or an electrically negative UCAP terminal rod.

2. The UCAP module of claim 1, wherein the ultracapacitor cells have electrically positive and negative terminals, and wherein the positive terminal of a first ultracapacitor cell is coupled to the negative terminal of a next ultracapacitor cell to form a series configuration comprising the first and the next ultracapacitor cells.

3. The UCAP module of claim 1, wherein the ultracapacitor cells have electrically positive and negative terminals, and wherein the positive terminal of a first ultracapacitor cell is coupled to the positive terminal of a next ultracapacitor cell to form a parallel configuration comprising the first and the next ultracapacitor cells.

4. A UCAP modular system comprising at least a first and a second UCAP module, each as recited in claim 1, wherein at least one of the UCAP terminal rods of the first UCAP module is electrically and mechanically coupled to at least one of the UCAP terminal rods of the second UCAP module, thereby configuring the first UCAP module and the second UCAP module in either a series or parallel configuration, and wherein at least one of the UCAP terminal rods of the second UCAP module comprises either an electrically positive UCAP terminal rod of the second UCAP module or an electrically negative UCAP terminal rod of the second UCAP module.

5. The UCAP modular system of claim 4, wherein the at least one of the UCAP terminal rods of the first UCAP module comprises a positive UCAP terminal rod that is mechanically and electrically coupled to a negative UCAP terminal rod of the second UCAP module thereby forming a series configuration of the UCAP modules.

6. The UCAP modular system of claim 4, wherein the at least one of the UCAP terminal rods of the first UCAP module comprises a negative UCAP terminal rod that is mechanically and electrically coupled to a positive UCAP terminal rod of the second UCAP module thereby forming a series configuration of the UCAP modules.

7. The UCAP modular system of claim 4, wherein at least one of the UCAP terminal rods of the first UCAP module comprises an electrically positive UCAP terminal rod and at least one of the UCAP terminal rods of the first UCAP module comprises an electrically negative UCAP terminal rod, and wherein at least one of the UCAP terminal rods of the second UCAP module comprises an electrically positive UCAP terminal rod of the second UCAP module and at least one of UCAP terminal rods of the second UCAP module comprises an electrically negative UCAP terminal rod of the second UCAP module, and wherein the positive UCAP terminal rod of the first UCAP module is electrically and mechanically coupled to the positive UCAP terminal rod of the second UCAP module and the negative UCAP terminal rod of the first UCAP module is electrically and mechanically coupled to the negative UCAP terminal rod of the second UCAP module, thereby forming a parallel configuration between the UCAP modules.

8. The UCAP modular system of claim 4, further comprising at least one connector rod, wherein the connector rods electrically and mechanically couple the UCAP terminal rods of the first UCAP module to the UCAP terminal rods of the second UCAP module.

9. The UCAP modular system of claim 8, wherein at least one of the UCAP terminal rods of the first UCAP module comprises a positive UCAP terminal rod and at least one of the UCAP terminal rods of the second UCAP module comprises a negative UCAP terminal rod of the second UCAP module, and wherein one of the connector rods mechanically and electrically couples the positive UCAP terminal rod of the first UCAP module to the negative UCAP terminal rod of the second UCAP module thereby forming a series configuration of the UCAP modules.

10. The UCAP modular system of claim 8, wherein at least one of the UCAP terminal rods of the first UCAP module comprises a negative UCAP terminal rod and at least one of the UCAP terminal rods of the second UCAP module comprises a positive UCAP terminal rod of the second UCAP module, and wherein one of the connector rods mechanically and electrically couples the negative UCAP terminal rod of the first UCAP module to the positive UCAP terminal rod of the second UCAP module thereby forming a series configuration of the UCAP modules.

11. The UCAP modular system of claim 8, wherein at least one of the UCAP terminal rods of the first UCAP module comprises an electrically positive UCAP terminal rod and at least one of the UCAP terminal rods of the first UCAP module comprises an electrically negative UCAP terminal rod, and wherein at least one of the UCAP terminal rods of the second UCAP module comprises an electrically positive UCAP terminal rod of the second UCAP module and at least one of the UCAP terminal rods of the second UCAP module comprises an electrically negative UCAP terminal rod of the second UCAP module, and wherein one of the connector rods mechanically and electrically couples the positive UCAP terminal rod of the first UCAP module to the positive UCAP terminal rod of the second UCAP module and wherein another one of the connector rods mechanically and electrically couples the negative UCAP terminal rod of the first UCAP module to the negative UCAP terminal rod of the second UCAP module, thereby forming a parallel configuration of the UCAP modules.

12. The UCAP module of claim 1, wherein the charging unit accepts either a DC or an AC input power source having a selected voltage, and wherein the charging unit electrically isolates the ultracapacitor cells from the input power source.

13. The UCAP module of claim 1, wherein the charging unit accepts an AC input power source and wherein the UCAP module outputs DC power for use by accessory devices connected thereto.

14. The UCAP module of claim 1, wherein the UCAP module comprises a "drop-in" replacement of a battery energy storage device having high power surge or cycle requirements.

15. The UCAP module of claim 1, wherein the casing comprises:
   (a) a top casing cover positioned at the top of the UCAP module;
   (b) a bottom casing cover positioned at the bottom of the UCAP module;
   (c) a top mounting plate used to mount the top casing cover to the UCAP module; and
   (d) a bottom mounting plate used to mount the bottom casing cover to the UCAP module; wherein the top and bottom mounting plates work together to firmly hold the ultracapacitor cells and the charging unit in place within the UCAP module.

16. The UCAP module of claim 1, further comprising at least one bus plate, wherein the bus plates electrically couple the ultracapacitor cells together in a parallel, series or combination of both a parallel and a series configuration.

17. A UCAP module, comprising:
   (a) at least two ultracapacitor cells configured to be coupled in a parallel, series and in a combination of both parallel and series configurations;
   (b) a charging unit accepting an input power source and electrically coupled to the ultracapacitors; wherein the charging unit charges the ultracapacitor cells from a discharged state to a fully charged state;
   (c) a casing mechanically holding the ultracapacitor cells and the charging unit in place within the UCAP module, the ultracapacitor cells and the charging unit disposed within the casing;
   (d) at least one UCAP terminal rod extending throughout the UCAP module such that the at least one UCAP terminal rod is externally accessible from a top side and from a bottom side of the UCAP module, wherein at least one of the UCAP terminal rods comprises either an electrically positive UCAP terminal rod or an electrically negative UCAP terminal rod; and
   (e) at least one connector rod, wherein the connector rods electrically and mechanically couple the UCAP terminal rods to external energy storage devices.

18. A UCAP module, comprising:
(a) at least two ultracapacitor cell means for storing energy and delivering power, wherein the ultracapacitor cell means are configured to be coupled in a parallel, series and in a combination of both parallel and series configurations;
(b) a means for charging the ultracapacitor cell means from a discharged state to a fully charged state;
(c) a casing means for mechanically holding the ultracapacitor cell means and the charging means in place within the UCAP module, wherein the ultracapacitor cell means and the charging means are disposed within the casing means; and
(d) UCAP terminal rod means for distributing power throughout the UCAP module, wherein the UCAP terminal rod means extend throughout UCAP module such that the UCAP terminal rod means are externally accessible from a top side and from a bottom side of the UCAP module.

19. The UCAP modular system of claim 4, wherein the UCAP modular system outputs a DC output power, and wherein the UCAP modular system functions as a power conversion system converting the input power to the DC output power.

20. The UCAP modular system of claim 19, wherein the DC output power provided by the UCAP modular system comprises a frequency stabilized DC voltage output without need for additional power conversion equipment.

* * * * *